(12) United States Patent
Galeazzi

(10) Patent No.: US 12,012,645 B2
(45) Date of Patent: Jun. 18, 2024

(54) SYSTEM AND PROCESS FOR THE RECOVERY OF TITANIUM, TITANIUM ALLOY, ZIRCONIUM AND ZIRCONIUM ALLOY SCRAP

(71) Applicant: Gianluca Galeazzi, Falconara Marittima (IT)

(72) Inventor: Gianluca Galeazzi, Falconara Marittima (IT)

( * ) Notice: Subject to any disclaimer, the term of this patent is extended or adjusted under 35 U.S.C. 154(b) by 537 days.

(21) Appl. No.: 17/296,620

(22) PCT Filed: Nov. 5, 2019

(86) PCT No.: PCT/EP2019/080296
§ 371 (c)(1),
(2) Date: May 25, 2021

(87) PCT Pub. No.: WO2020/120034
PCT Pub. Date: Jun. 18, 2020

(65) Prior Publication Data
US 2022/0002839 A1    Jan. 6, 2022

(30) Foreign Application Priority Data

Dec. 12, 2018  (IT) .......................... 102018000011004

(51) Int. Cl.
| | |
|---|---|
| *C22B 34/14* | (2006.01) |
| *B03C 1/10* | (2006.01) |
| *B03C 1/16* | (2006.01) |
| *B03C 1/247* | (2006.01) |
| *B03C 1/30* | (2006.01) |

(Continued)

(52) U.S. Cl.
CPC ................ *C22B 34/14* (2013.01); *B03C 1/10* (2013.01); *B03C 1/16* (2013.01); *B03C 1/247* (2013.01); *B03C 1/30* (2013.01); *C22B 7/005* (2013.01); *C22B 9/16* (2013.01); *C22B 34/1204* (2013.01);

(Continued)

(58) Field of Classification Search
None
See application file for complete search history.

(56) References Cited

U.S. PATENT DOCUMENTS

| | | |
|---|---|---|
| 4,108,644 A | 9/1978 | Walberg et al. |
| 4,363,722 A | 12/1982 | Dresty et al. |

FOREIGN PATENT DOCUMENTS

| | | |
|---|---|---|
| CN | 102899495 A | 1/2013 |
| CN | 107201446 A | 9/2017 |

(Continued)

OTHER PUBLICATIONS

International Search Report for corresponding PCT/EP2019/080296, dated Jan. 6, 2020.

(Continued)

*Primary Examiner* — Anthony M Liang
(74) *Attorney, Agent, or Firm* — Egbert, McDaniel & Swartz, PLLC

(57) ABSTRACT

A system for the recovery of titanium, titanium alloys, zirconium and zirconium alloys is disclosed. The system is fed with a mixture of chips including titanium chips, titanium alloy chips, zirconium chips and zirconium alloy chips, ferromagnetic chips and electrically conductive non-ferromagnetic chips. The system has at least one magnetic separator, a drying device and an Eddy current separator.

5 Claims, 2 Drawing Sheets

(51) Int. Cl.
*C22B 7/00* (2006.01)
*C22B 9/16* (2006.01)
*C22B 34/12* (2006.01)

(52) U.S. Cl.
CPC ...... *C22B 34/1218* (2013.01); *C22B 34/1295* (2013.01); *B03C 2201/20* (2013.01)

(56) References Cited

FOREIGN PATENT DOCUMENTS

JP 2009226302 A 10/2009
WO WO-2016034884 A1 * 3/2016 ............. C22B 1/005

OTHER PUBLICATIONS

Written Opinion of the International Searching Authority for corresponding PCT/EP2019/080296, dated Jan. 6, 2020.
Dos Reis et al, "Recycling and Melting Process of the Zirconium Alloy Chips", Oct. 27, 2017, Retrieved from the Internet: URL:https://inis.iaea.org/collection/NCLCollectionStore/_Public/49/018/49018141.pdf? =1&r=1.

* cited by examiner

SYSTEM AND PROCESS FOR THE RECOVERY OF TITANIUM, TITANIUM ALLOY, ZIRCONIUM AND ZIRCONIUM ALLOY SCRAP

The present patent application for industrial invention relates to a system and a process for the recovery of titanium, titanium alloy and/or zirconium, zirconium alloy scrap contained in a mixture of contaminating metal chips.

The inventive idea is the result of a necessity that is currently encountered in the production of finished pieces made of titanium or zirconium, wherein chips, scrap and pieces that are considered as "waste" are generated during the processing of these materials.

In particular, the applicant devised the present invention for the recovery of titanium, titanium alloys, zirconium and zirconium alloys and of all metals and alloys that are inert to magnetic fields.

As it is known, titanium and other inert materials are worked with milling cutters and other machine tools in such a way to obtain finished parts suitable for being used in the aeronautical, biomedical and automotive fields.

The milling cutters and the other machine tools are operated according to a subtractive method because material is removed from the initial workpiece in order to obtain a finished piece.

The removal of material tends to generate a large amount of scrap, and especially chips, in the vicinity of the machine.

In general, the same milling cutters used to work inert materials (titanium, zirconium) are used to work other materials, such as aluminum, bronze, copper, iron, nickel-based alloys and the like.

The inaccurate cleaning of the machine will inevitably generate a mixture of chips that comprises a plurality of chips of different elements in the vicinity of the machine.

Therefore, if the machine is not properly cleaned, the processing of titanium (or zirconium) will generate a mixture of chips and scrap with chips of other contaminating materials, such as aluminum, copper, bronze, and magnetic alloys, in addition to titanium (or zirconium).

A recovery process is necessary to recover and reuse the contaminated titanium.

As it is known, the factories and the companies that process titanium and zirconium seldom have plans for the recovery of materials and do not implement suitable procedures to clean the machines in order to obtain titanium or zirconium that is not mixed with other materials. In view of the above, the material generated from the processing operations is considered as a low value material and is used for less valuable applications.

US4363722 discloses a process and an apparatus specifically directed to the removal of both magnetic and non-magnetic tungsten carbide chips, and other magnetic and non-magnetic high density inclusions, from titanium machining scrap.

US4108644 discloses a method for manufacturing reactive metal alloys using revert raw materials as a principal raw material source.

CN107201446 discloses a method for separating scrap in non-magnetic alloys.

The limited culture of the market for the recovery of said materials urged the applicant to devise a system for the processing and the recovery of titanium, titanium alloys, zirconium and zirconium alloys, in such a way to recover the machined material without losing its economic value because of the mixing with other contaminating metal materials. It must be noted that the system and the process devised by the applicant are innovative and have no antecedents in the prior art.

The purpose of the present invention is to overcome the aforementioned drawbacks by devising a system and a process for the processing and the recovery of titanium and titanium alloys in order to obtain titanium, titanium alloys, zirconium and zirconium alloys that are not mixed with contaminating elements.

Another purpose of the present invention is to devise a process for processing and separating titanium chips, titanium alloy chips, zirconium chips and zirconium alloy chips from contaminating elements.

An additional purpose of the present invention is to devise a system that is inexpensive and a process that is simple to implement.

These purposes are achieved according to the invention with the characteristics listed in the appended independent claim 1.

Advantageous embodiments appear from the dependent claims.

The system of the invention is defined by claim 1.

For clarity purposes, the description of the system according to the invention continues with reference to the appended drawings, which only have an illustrative, not limiting value, wherein.

The system (100) of the invention is used for the recovery of titanium, titanium alloys, zirconium and zirconium alloys. More precisely, the system (100) is fed with a mixture of chips (H) comprising titanium chips, titanium alloy chips, zirconium chips and zirconium alloy chips, ferromagnetic chips and electrically conductive non-ferromagnetic chips. The material is processed in order to extract the ferromagnetic chips and the electrically conductive non-ferromagnetic chips from said mixture of chips (H).

The system (100) removes the ferromagnetic chips and the electrically conductive non-ferromagnetic chips from said mixture of chips (H), thus obtaining a mixture of chips that is exclusively or almost exclusively composed of titanium, titanium alloys, zirconium and zirconium alloys.

It must be noted that the system (100) was initially devised for the recovery of commercially pure titanium or titanium alloys, such as Ti 6Al 4V, Ti 6Al 2Sn 4Zr 2Mo, Ti 6Al 2Sn 4Zr 6Mo and Ti 6Al 7Nb from a mixture of chips generated by machining operations, which also comprises ferromagnetic chips and electrically conductive chips. Moreover, it must be noted that such a process is effective if the scrap consists in a mixture of titanium or zirconium alloys, provided that the alloys are homogeneous and have the same chemical composition.

Alternatively, instead of titanium, the system (100) can be used for the processing and the recovery of Zirconium 700 and its alloys (zirconium 701 and zirconium 702) from a mixture of chips (H) that comprises multiple materials.

Figure 1:
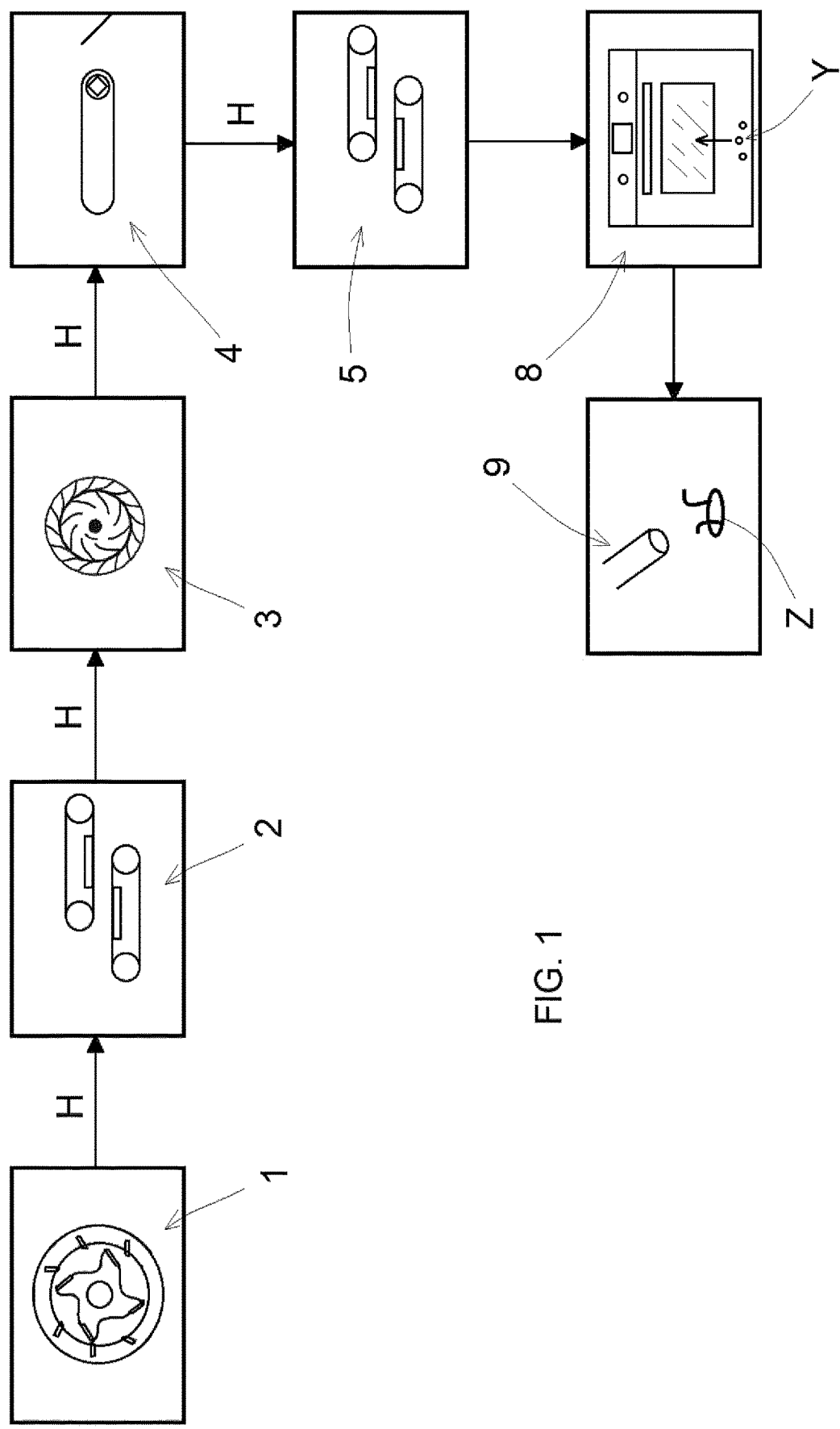
FIG. 1 is a block diagram of the system according to the invention.

With reference to FIG. 1, the system (100) of the invention for the recovery of titanium and zirconium comprises a first magnetic separator and a second magnetic separator (1, 5) that remove the ferromagnetic chips from said mixture of chips (H).

Each magnetic separator (1, 2) can be an ordinary drum magnetic separator or an ordinary belt magnetic separator.

The belt magnetic separator is preferably used as magnetic separator (1, 2) in the present invention.

The system also comprises a drying device (3) to extract water and liquids from the chips of said mixture of chips (H). It must be noted that the chips generated by the machines are impregnated with liquids and refrigerant oils used to refrigerate the materials while they are worked by the machines (mills, lathes, and the like).

According to a first embodiment, the drying device (3) comprises a centrifuge.

The centrifuge comprises a centrifugation chamber that is constantly fed with the mixture of chips (H) at a low speed. The centrifuge comprises a rotating body disposed inside the centrifugation chamber.

The rotating body comprises a disk with a truncated-conical shape and a central outlet that delivers the mixture of chips from said centrifugation chamber.

The rotation extracts the liquids contained in the chips disposed inside the rotating body by means of the centrifugal force. Said liquids pass through micro-holes provided in the rotating body and are conveyed separately from said mixture of chips (H), which is ejected from the rotating body through said central hole.

Preferably, said rotating body of the centrifuge is rotated at a speed of 1,500 revolutions per minute.

According to a second embodiment of the invention, instead of a centrifuge, the drying device (3) comprises an ordinary dryer that dries said mixture of chips (H) at a drying temperature comprised between 90° C. and 120° C.

The drying with the centrifuge or the drying device permits to obtain a mixture of dry chips (H), in which each chip of the mixture of chips (H) has a percentage of liquids lower than 3-5% of the mass of the chip.

The system (100) of the invention also comprises an Eddy current separator (4) to extract the electrically conductive non-ferromagnetic chips from said mixture of chips (H).

The Eddy current separator (4) comprises a vibrating conveyor belt disposed in horizontal position and driven by two end rollers.

One of said two end rolls contains a magnetic rotor that generates a high-frequency and high-density magnetic field. Said magnetic field induces an Eddy current in the chips of electrically conductive non-ferromagnetic material (aluminum, bronze, copper, lead). The Eddy current creates a magnetic field that opposes the source magnetic field of the magnetic rotor, moving them away from the source of the magnetic rotor. In view of the above, when passing in the vicinity of the rotor, the electrically conductive non-ferromagnetic chips are lifted in the air and released by the vibrating conveyor belt with a different trajectory compared to the titanium chips, the titanium alloy chips, the zirconium chips and the zirconium alloy chips. The release of the chips with different trajectories permits the separation of the electrically conductive non-ferromagnetic chips from the titanium chips, the titanium alloy chips, the zirconium chips, and the zirconium alloy chips.

The drying of the mixture of chips (H) is necessary to prevent the particles of contaminated material from adhering to the alloy chips or to the metal chips to be processed when the mixture of chips (H) passes in the Eddy current separator (4).

Advantageously, the system (100) also comprises a crushing machine (1) for chips.

The crushing machine (1) crushes the large-sized chips delivered by the machines that make roughing operations on bars or slabs. Said crushing machine (100) is used to reduce the size of the chips in the mixture of chips (H), making them suitable for being processed with said magnetic separators (2, 5) and with said Eddy current separator (4).

The crushing machine (1) consists in a rotary mill with rotating blades.

With reference to FIG. 1, the system (100) comprises a melting furnace (8) suitable for melting a "significant" quantity of chips (Y) in such a way to generate a "sample" (Z) of the mixture of chips (H) delivered by said magnetic separators (2, 5) and by said Eddy current separator (4). The term "significant" indicates at least 50 grams of chips.

Preferably, the melting furnace (8) consists in an arc furnace with non-consumable graphite electrode that operates in an argon atmosphere.

The system (100) also comprises a chemical analyzer (9) suitable for detecting and measuring the chemical components contained in the "sample" (Z) obtained from melting the chips in the melting furnace (8).

Advantageously, the system (100) also comprises a double cone mixer disposed downstream the Eddy current separator (4). When loaded with the mixture of chips (H) for approximately 50% of its volume, by means of a rotation similar to the one of a concrete mixer, the double cone mixer produces a uniform mixture of chips (H), in such a way that the "significant" quantity of chips (Y) taken from the mixture of chips (H) is highly representative of the mixture of chips (H), allowing a reliable chemical analysis of the "sample" (Z).

According to a preferred embodiment of the system of the invention, the chemical analyzer (9) consists in a quantum meter. By analyzing the electromagnetic radiation emitted by the sample (Z), the quantum meter identifies and measures the elements contained in the sample (Z).

Although not shown in FIG. 1, the system can also comprise an additional magnetic separator disposed downstream the crushing machine (1) and upstream the first magnetic separator (2).

The mixture of chips is moved and transferred from a machine to another machine of the system (100) manually with trolleys that are transported by a user, or alternatively with means of transportation that transport the mixture of chips (H) from a machine to another machine, in such a way that the system (100) is an automatic chain system wherein the mixture of chips (H) delivered from the metal working machines is processed by the system (100) with a series of sequential operations without having to manually move the mixture of chips (H) from an element to another element of the system (100).

In particular, said means of transportation comprise a set of conveyor belts that move the mixture of chips (H) from an element to another element of the system (100). Said conveyor belts are fed by means of hoppers that receive the mixture of chips (H) from the machine installed upstream. For illustrative purposes, the mixture of chips (H) delivered from the centrifuge is loaded in a hopper that delivers the mixture of chips (H) on a conveyor belt that feeds the Eddy current separator (4).

Figure 2:
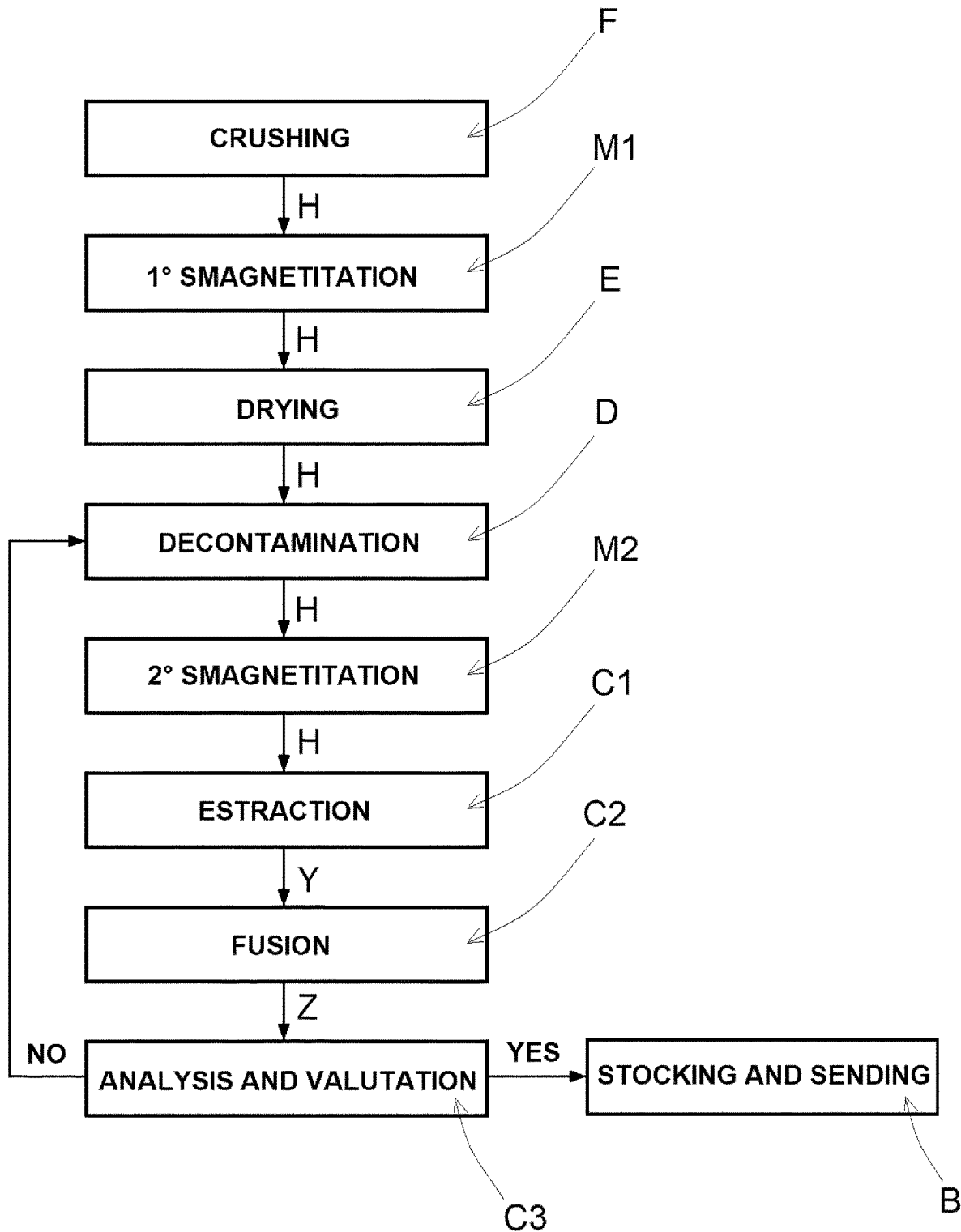
FIG. 2 is a flow chart that illustrates the process for the processing and the recovery of titanium, titanium alloys, zirconium and zirconium alloys according to the invention.

With reference to FIG. 2, a process for the processing and the recovery of titanium, titanium alloys, zirconium and zirconium alloys with the system (100) of the invention illustrated in the preceding description is disclosed.

If necessary, the process initially comprises a step of crushing (F), wherein the chips of the mixture of chips (H) delivered from industrial machines are broken into pieces with suitable dimensions for successive operations.

The mixture of crushed chips (H) is disposed on the magnetic separator (2), which carries out a first demagnetization step (M1), wherein a first portion of ferromagnetic chips is extracted from said mixture of chips (H).

After the first demagnetization step (M1), a drying step (E) is carried out with the drying device (3), wherein the mixture of chips (H) is dried and oils and liquids are extracted from the mixture of chips (H).

The mixture of dry chips (H) delivered from the drying step (E) is introduced in said Eddy current separator (4), which carries out a decontamination step (D) wherein the electrically conductive non-ferromagnetic chips are extracted from the mixture of chips (H).

The decontamination step (D) can be carried out repeatedly according to the specifications of the material to be obtained; more precisely, the mixture of dry chips (H) is repeatedly introduced in the Eddy current separator (4).

A second demagnetization step (M2) is carried out after the decontamination step (D) with the second magnetic separator (5), wherein an additional portion of ferromagnetic chips that was not previously extracted during the first demagnetization step (M1) is extracted.

Preferably, the process comprises an additional demagnetization step after the crushing step (F) and before the first demagnetization step (M1).

The redundancy of said demagnetization steps (M1, M2) delivers a mixture of chips (H) without ferromagnetic chips at the outlet of the system (100).

The second demagnetization step (M2) is followed by an inspection step that comprises several steps, namely: an extraction step (C1), a melting step (C2), and an analysis and evaluation step (C3).

The extraction step (C1) provides for extracting a "significant" quantity of chips (Y) from the mixture of chips (H) processed by the second magnetic separator (5).

The "significant" quantity of chips (Y) extracted from the extraction step (C1) is melt in the melting step (C2), obtaining a sample (Z) of material. Said melting step (C2) is carried out by means of the melting furnace (8).

Then, the sample (Z) obtained from the melting step (C2) is used to carry out said analysis and evaluation step (C3) by means of the chemical analyzer (9).

If the values obtained from the analysis and evaluation steps (C3) of the sample (Z) are satisfactory and comply with the requested parameters according to the customer specifications, a stocking and shipping step is carried out (B), wherein the mixture of processed chips is stocked and successively shipped to the customer.

On the contrary, if the values do not comply with the requested parameters, an additional decontamination step (D), demagnetization step (M2) and inspection step must be carried out until the values comply with the specific parameters requested by the customer.

With reference to the preceding description, it appears evident that such a system (100) is suitable for recovering titanium, titanium alloys, zirconium and zirconium alloys without ferromagnetic contaminants and electrically conductive non-ferromagnetic contaminants.

More precisely, said system (100) offers a solution for the recovery of material for all industries and/or workshops that process titanium, titanium alloys, zirconium and zirconium alloys, in which the chips or scrap generated by the working machines (mills, lathes and the like) are usually considered as low value waste. By using the system (100) for processing and recovering purposes, the material considered as "waste" is purified in such a way to obtain a mixture of chips without contaminants that can be reused to produce finished pieces for the aeronautical, biomedical and automotive fields.

Numerous variations and modifications can be made to the present embodiment of the invention, which are within the reach of an expert of the field, falling in any case within the scope of the invention as disclosed by the appended claims.

The invention claimed is:

1. A system for recovery of titanium, titanium alloys, zirconium or zirconium alloys, wherein the system is fed with a mixture of chips, the mixture of chips being titanium chips, titanium alloy chips, zirconium chips, zirconium alloy chips, ferromagnetic chips or electrically conductive non-ferromagnetic chips, the system comprising:
    at least one magnetic separator adapted to extract the ferromagnetic chips from the mixture of chips;
    a drying device adapted to extract a liquid from the mixture of chips; and
    an Eddy current separator adapted to extract electrically conductive non-ferromagnetic chips from the mixture of chips, said at least one magnetic separator comprising:
        a first magnetic separator disposed upstream of said drying device; and
        a second magnetic separator disposed downstream of said Eddy current separator.

2. The system of claim 1, further comprising:
    a crushing machine disposed upstream of said drying device and adapted to crush and break the mixture of chips.

3. The system of claim 1, wherein said drying device is a centrifuge.

4. The system of claim 1, wherein said drying device is a dryer.

5. The system of claim 1, further comprising:
    a melting furnace disposed downstream of said Eddy current separator, said melting furnace adapted to melt a quantity of the mixture of chips so as to generate a sample of the mixture of chips; and
    a chemical analyzer adapted to chemically analyze a composition of the sample of the mixture of chips.

* * * * *